(12) United States Patent
Gupta et al.

(10) Patent No.: US 12,335,806 B2
(45) Date of Patent: Jun. 17, 2025

(54) PRIORITY BASED STAND-ALONE AND CARRIER AGGREGATED FREQUENCY BAND USAGE

(71) Applicant: QUALCOMM Incorporated, San Diego, CA (US)

(72) Inventors: Tushar Gupta, Hyderabad (IN); Sidhanta Ranjan Sahu, Hyderabad (IN); Kedar Patankar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 510 days.

(21) Appl. No.: 17/658,976

(22) Filed: Apr. 12, 2022

(65) Prior Publication Data

US 2023/0328613 A1    Oct. 12, 2023

(51) Int. Cl.
*H04W 36/30* (2009.01)
*H04W 36/00* (2009.01)

(52) U.S. Cl.
CPC ....... *H04W 36/30* (2013.01); *H04W 36/0058* (2018.08)

(58) Field of Classification Search
None
See application file for complete search history.

(56) References Cited

U.S. PATENT DOCUMENTS

| | | | | |
|---|---|---|---|---|
| 9,125,146 B1 * | 9/2015 | Edara | | H04W 48/18 |
| 9,265,083 B2 * | 2/2016 | Kumar | | H04W 76/19 |
| 9,775,154 B2 * | 9/2017 | Sundar | | H04W 72/0453 |
| 10,117,160 B2 * | 10/2018 | Zhu | | H04W 48/16 |
| 2020/0015157 A1 * | 1/2020 | Xue | | H04W 72/56 |
| 2020/0329523 A1 | 10/2020 | Yi et al. | | |
| 2021/0127256 A1 * | 4/2021 | Li | | H04W 60/005 |

FOREIGN PATENT DOCUMENTS

| | | |
|---|---|---|
| WO | 2010087334 A1 | 8/2010 |
| WO | 2016183025 A1 | 11/2016 |
| WO | 2018120239 A1 | 7/2018 |
| WO | 2022055561 A1 | 3/2022 |

OTHER PUBLICATIONS

Apple Inc: "Additional Issues Related to MUSIM—Aspects of MUSIM RRC Band Conflict, Processing Delay and Caller ID Retrieval Requirements", 3GPP TSG-RAN WG2 Meeting# 117, R2-2202518, 3rd Generation Partnership Project, Mobile Competence Centre, 650, Route Des Lucioles, F-06921 Sophia-Antipolis Cedex, France, vol. RAN WG2, No. Electronic, Feb. 21, 2022-Mar. 3, 2022, Feb. 14, 2022, 13 Pages, XP052110453, Section 2.1, Sections 1-2.
International Search Report and Written Opinion—PCT/US2023/064418—ISA/EPO—Jun. 27, 2023.

* cited by examiner

*Primary Examiner* — Phirin Sam
(74) *Attorney, Agent, or Firm* — Patterson & Sheridan, LLP

(57) ABSTRACT

Certain aspects of the present disclosure provide techniques for priority based stand-alone and carrier aggregated frequency band usage. An example method that may be performed by a user equipment (UE) includes: maintaining a high-priority list (HPL) and a low-priority list (LPL) of frequency bands and combinations of frequency bands that are supported by the UE, wherein the HPL and the LPL are based on one or more hardware (HW) components of the UE; and taking one or more actions based on one or more measured parameters of the frequency bands or the combinations of frequency bands and at least one of the HPL and the LPL.

20 Claims, 9 Drawing Sheets

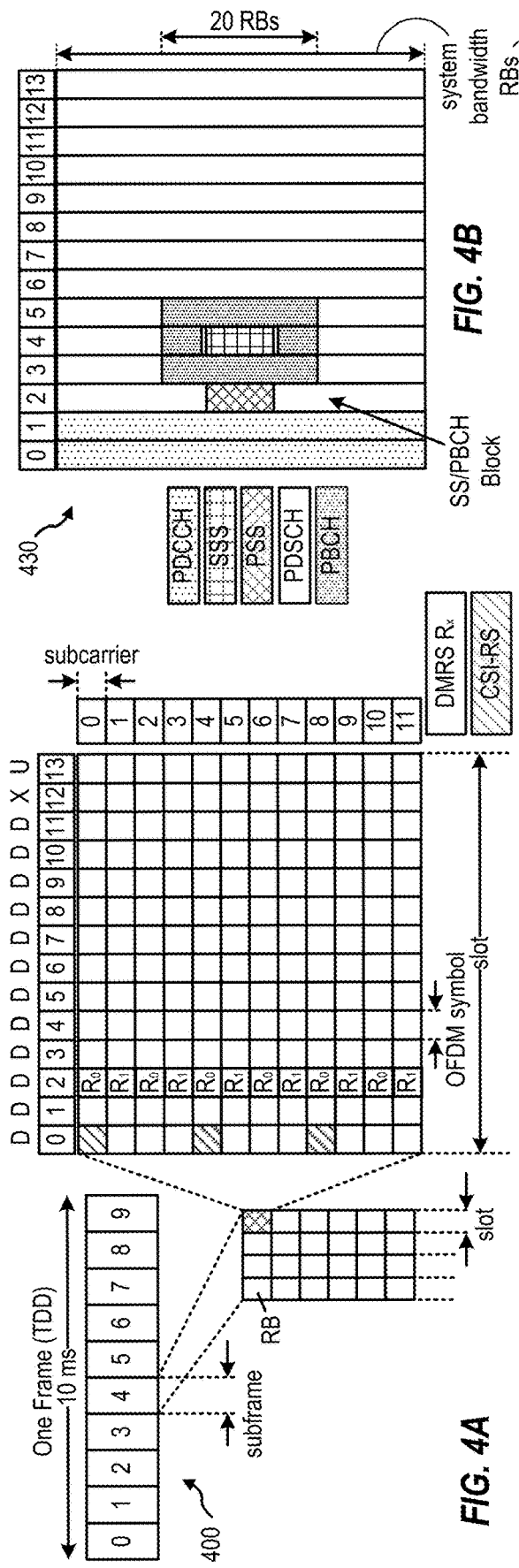
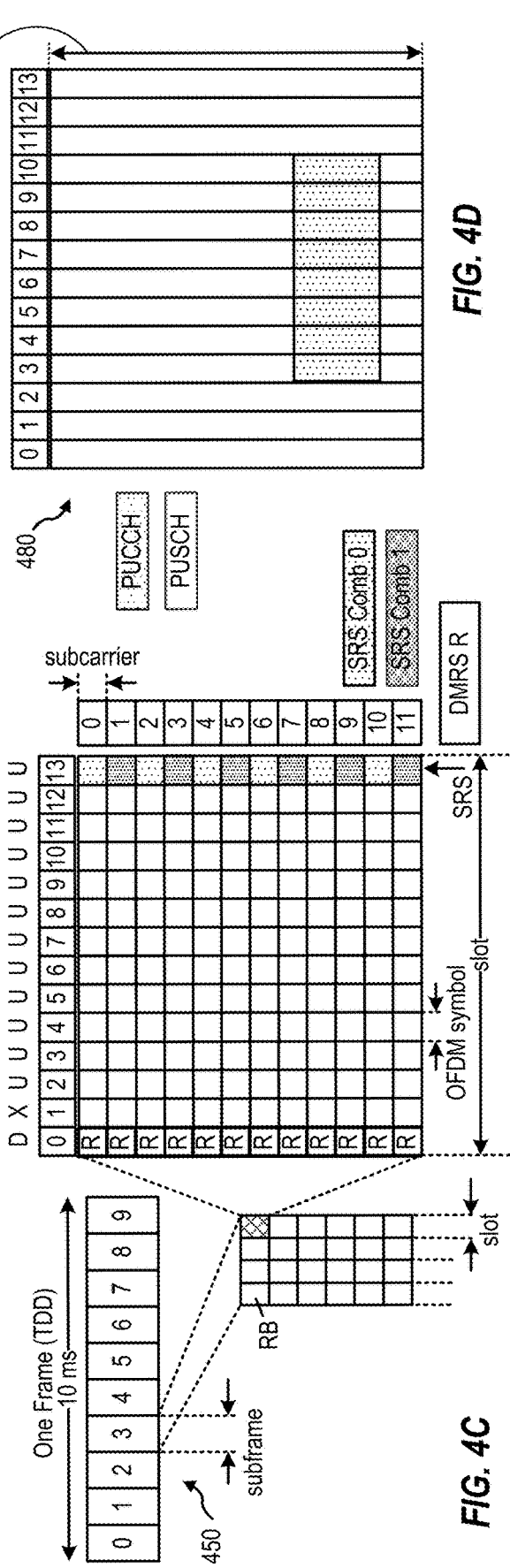
FIG. 4A
FIG. 4B
FIG. 4C
FIG. 4D

800

A METHOD FOR WIRELESS COMMUNICATION BY A USER EQUIPMENT (UE)

802

MAINTAIN A HIGH-PRIORITY LIST (HPL) AND A LOW-PRIORITY LIST (LPL) OF FREQUENCY BANDS AND COMBINATIONS OF FREQUENCY BANDS THAT ARE SUPPORTED BY THE UE, WHEREIN THE HPL AND THE LPL ARE BASED ON ONE OR MORE HARDWARE (HW) COMPONENTS OF THE UE

804

TAKE ONE OR MORE ACTIONS BASED ON ONE OR MORE MEASURED PARAMETERS OF THE FREQUENCY BANDS OR THE COMBINATIONS OF FREQUENCY BANDS AND AT LEAST ONE OF THE HPL AND THE LPL

*FIG. 8*

PRIORITY BASED STAND-ALONE AND CARRIER AGGREGATED FREQUENCY BAND USAGE

BACKGROUND

Field of the Disclosure

Aspects of the present disclosure relate to wireless communications, and more particularly, to techniques for priority based stand-alone and carrier aggregated frequency band usage.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method generally includes: maintaining a high-priority list (HPL) and a low-priority list (LPL) of frequency bands and combinations of frequency bands that are supported by the UE, wherein the HPL and the LPL are based on one or more hardware (HW) components of the UE; and taking one or more actions based on one or more measured parameters of the frequency bands or the combinations of frequency bands and at least one of the HPL and the LPL.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

FIG. 8 depicts a method for wireless communications.

DETAILED DESCRIPTION

Figure 1:
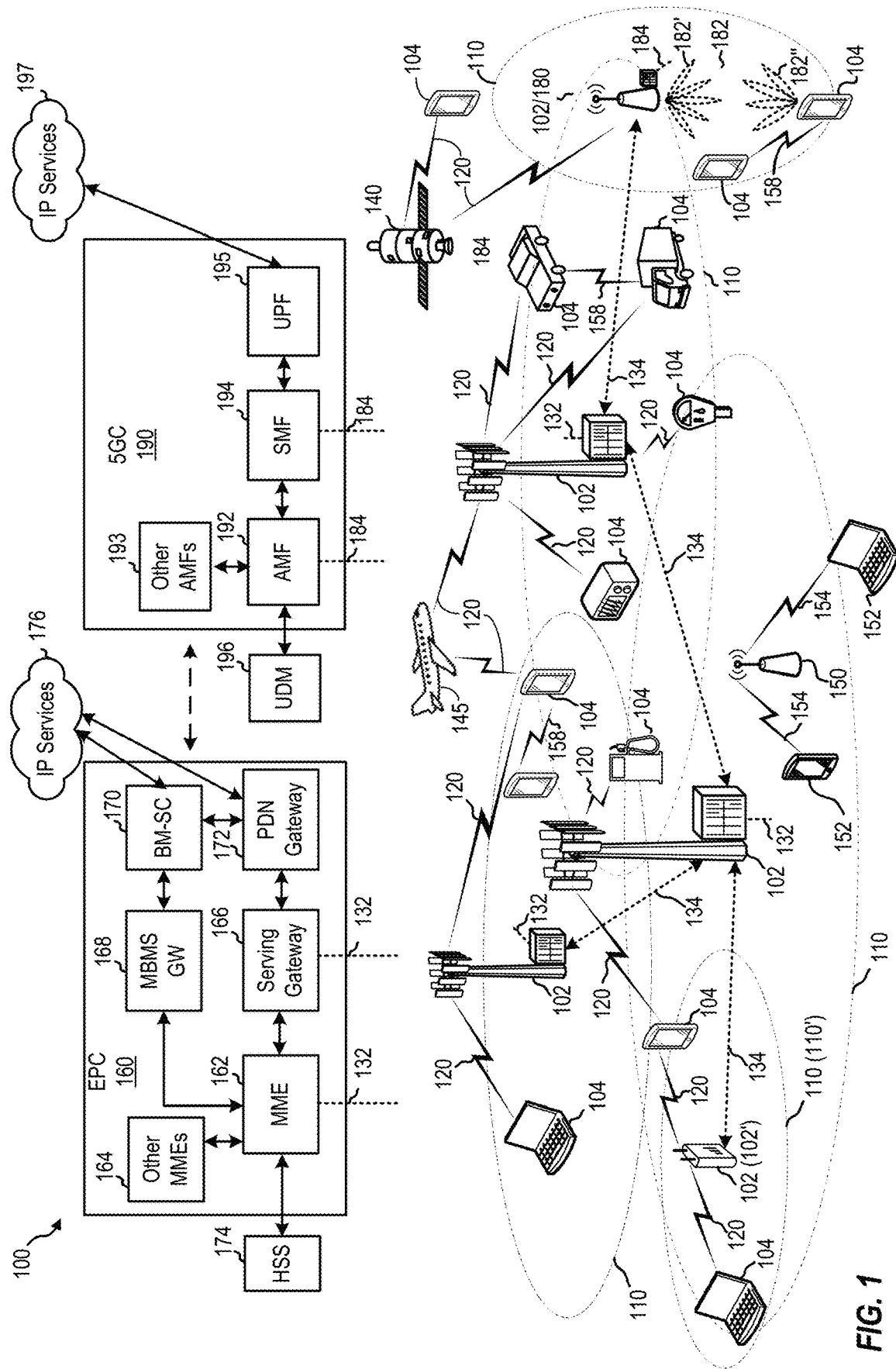
FIG. 1 depicts an example wireless communications network.

Aspects of the present disclosure provide apparatuses, methods, processing systems, and computer-readable mediums for a user equipment (UE) to maintain a high-priority list (HPL) and a low-priority list (LPL) of frequency bands and combinations of frequency bands supported by the UE, and for the UE to make frequency band camping decisions and report measurements relating to a frequency based on whether the frequency band is in the HPL or the LPL.

For multiple subscriber identification module (MSIM) UEs may operate in dual radio dual SIM dual standby (DR-DSDS) and dual SIM dual active (DSDA) modes, but many such UEs tune-away some RF resources from a connected SIM (e.g., a SIM engaged in a call) to monitor for pages for another SIM or to allow the other SIM to enter connected mode. Each tune-away of resources may have a dual effect of a SIM on a call not operating in the call for a time as well as decreased performance due to the network ramping down allocations while the UE is tuned away and then ramping up allocations to the UE after the UE tunes back to the call. In some cases, for lower cost chipset designs in particular, original equipment manufacturers (OEMs) may design these lower cost chip sets with limited RFFEs in order to reduce the cost of these chip sets. In such cases, tuning-away may be the only option for a UE employing such a lower cost chipset to support all MSIM features for concurrent support of both subs. Even for SSIM UEs, certain combinations of CA frequency bands give sub-optimal performance, due to the UEs' RFFE architectures or antennae performance. Such combinations of CA frequency bands are typically already known when a device is designed. If a UE utilizes a combination of carrier aggregated (CA) frequency bands such that the RFFE of the UE can simultaneously support a call with a connected SIM and listen for pages for another SIM, then the UE can avoid tuning-away of RFFE resources. Thus, such a UE taking action to cause the network (e.g., a network entity, such as a BS) to serve calls and send pages on such a combination may result in the UE having superior throughput on a call and missing fewer pages.

In aspects of the present disclosure, a UE (e.g., a SSIM UE or an MSIM UE) maintains two or more sets of stand-alone (SA) frequency bands and/or carrier aggregation (CA) combinations of frequency bands in two or more lists, which may include a high-priority list (HPL) and a low-priority list (LPL). The UE attempts to prioritize the frequency bands and/or combinations (also referred to herein as combos) of frequency bands included in the HPL in measurement reports such that the network (e.g., a network entity) selects frequency bands or combos in the UE's HPL when sending handoff commands or setting up calls on CA combinations, resulting in better throughput (TPUT) and/or page reception performance for the UE. The UE also prioritize frequency bands included in the HPL during initial camping procedures. Once the UE is camped on a SIM, the UE can update the HPL and/or LPL for the UE to begin signal acquisition by another SIM. Additionally, the UE, when camped on a cell in idle mode, can prioritize reselection to frequency bands and combos included in the HPL. The UE may prioritize frequency bands and combos included in the HPL by deleting non-HPL frequency bands and combos from measurement objects (MOs) received from the network.

Advantages of the techniques described herein may include improved throughput for a call. Any tune-away for a MSIM UE may decrease performance of the UE, as the tune-away can have dual impacts, including potentially missing packets (for any or all of the multiple SIMs of the UE) and potentially causing the network ramp-down traffic rates (e.g., transmission and reception data rates) to the UE, which can reduce throughput for a call while the network ramps-up the traffic rates to the UE to again reach peak levels. Additionally, known combos (e.g., combinations of frequency bands for which are known to reduce performance for a UE and/or cause the UE to tune-away), although having mitigation in place, can still be sub-optimal in performance due to mitigation methods like notching and/or cancellations resulting in the UE missing part of the spectrum of one or more of the frequency bands. Also, for a UE that is nominally capable of DSDA operations, having the UE prioritize frequency bands and combos in the UE's HPL may decrease the chances of the UE tuning-away and may enable the UE to engage in DSDA operations by preventing the UE from being configured to use certain combos that interfere in the UE engaging in DSDA operations.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
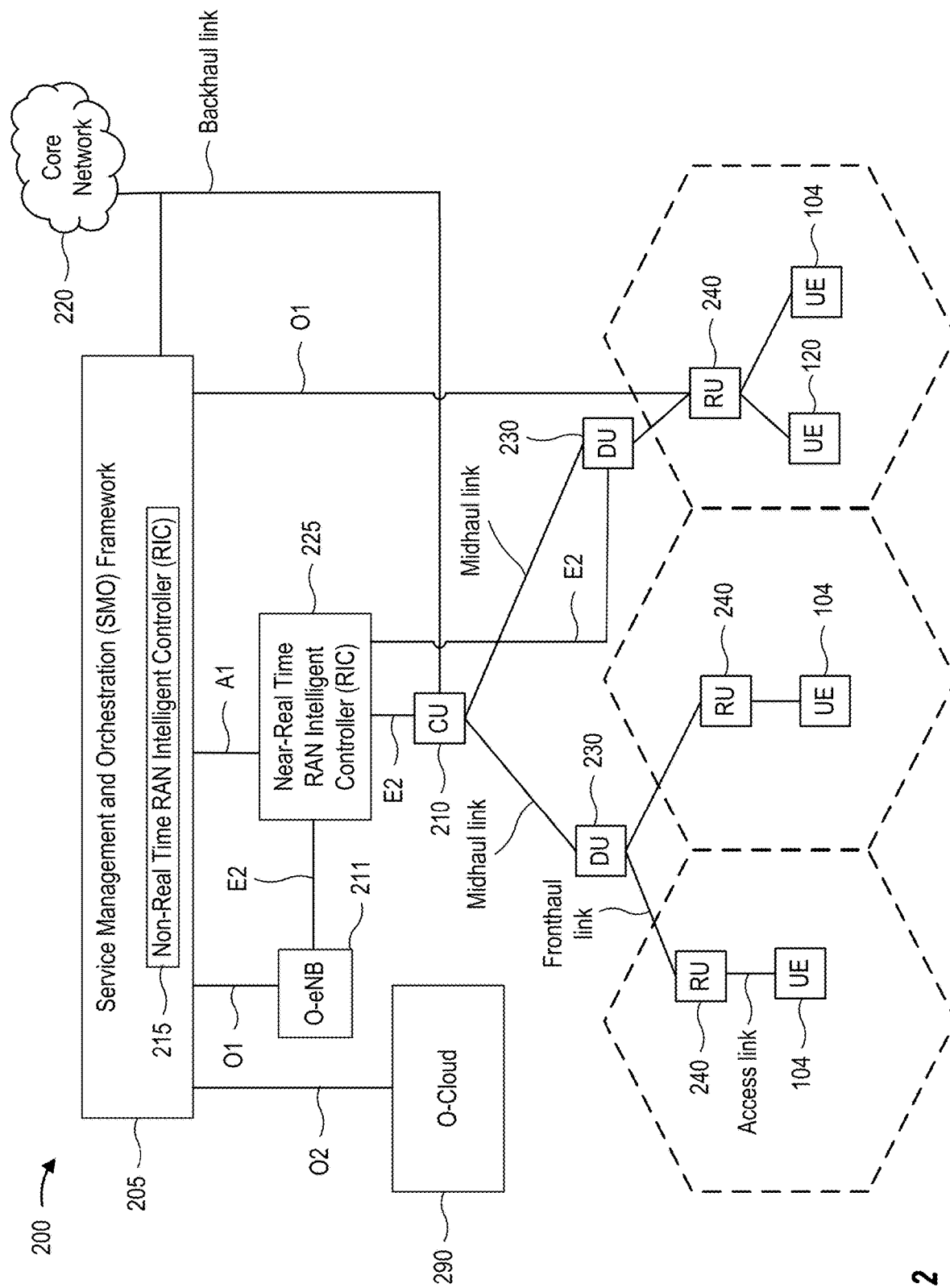
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz—6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". BS 180 may also receive the beamformed signal from UE 104 in one or more receive directions 182'. Base station 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi access point (AP) 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
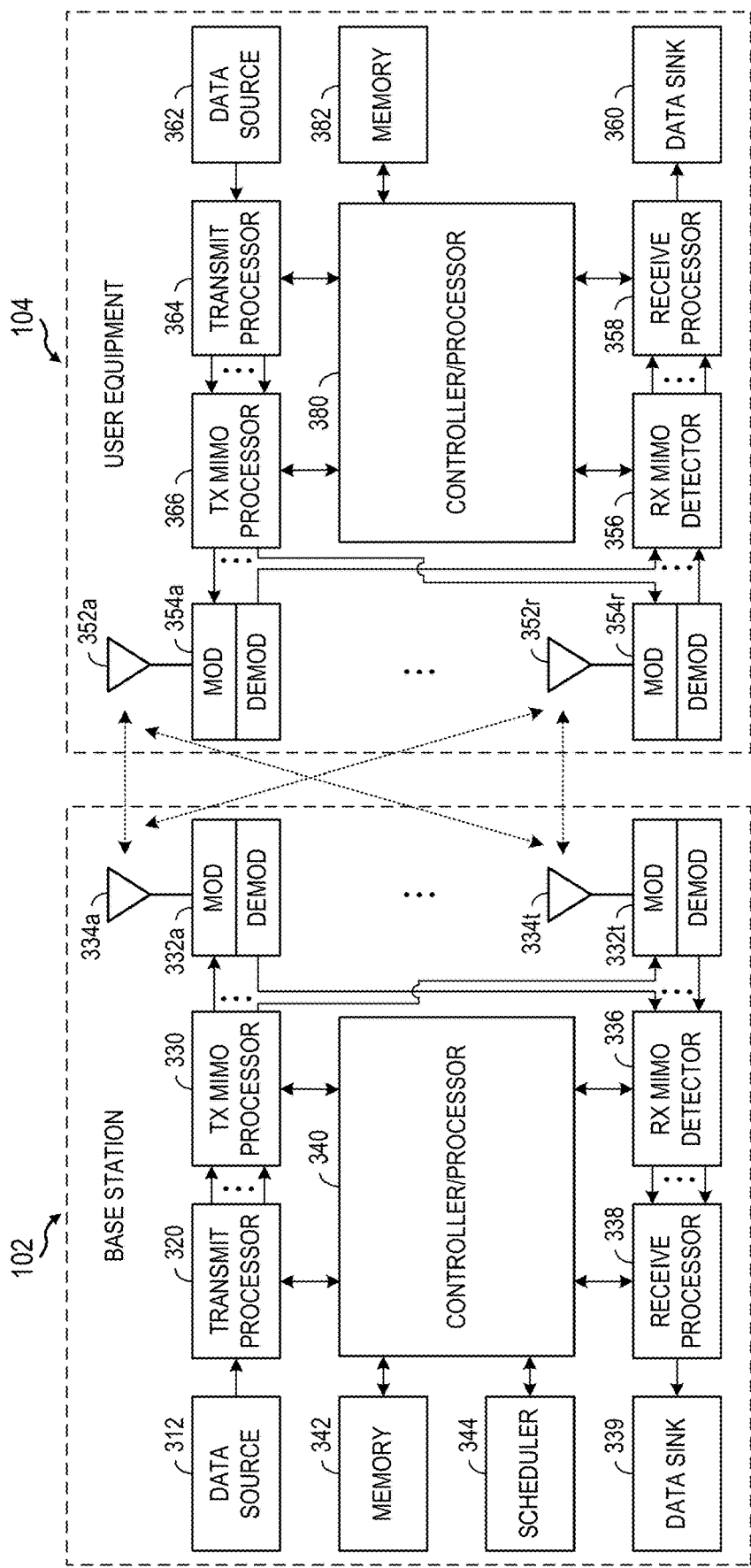
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of sub carriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Priority Based Stand-Alone and Carrier Aggregated Frequency Band Usage In some cases, a UE may operate using multiple subscriber identification modules (MSIMs). In such cases, it may be preferred for the UE to operate on certain stand-alone (SA) frequency bands and/or combinations of carrier-aggregated (CA) frequency bands for reasons such as an architecture a radio-frequency front end (RFFE) of the UE having superior performance on the certain SA frequency bands or combinations of CA frequency bands in MSIM and/or single SIM (SSIM) scenarios, the UE having better performance due to non-linear interference cancellation (NLIC), or the UE having better performance due to intermodulation distortion (IMD).

In some cases, the RFFE of the UE may directly affect which frequency bands and combinations of frequency bands may be preferred for operation of the UE as particular antennas or signal paths of the RFFE may result in superior performance for the UE, considering multiple performance factors.

MSIM UEs may operate in dual radio dual SIM dual standby (DR-DSDS) and dual SIM dual active (DSDA) modes. DR-DSDS mode refers to a UE having two SIMs in a standby mode (e.g., able to be paged, but not connected on a call). DSDA mode refers to a UE having two SIMs simultaneously active, e.g., the UE can simultaneously transmit/receive a call for each of the SIMS. While DR-DSDS and DSDA modes allow the UE to operate using MSIMs, many such UEs may be required to tune-away some RF resources from a connected SIM (e.g., a SIM engaged in a call) to monitor for pages for another SIM or to allow the other SIM to enter connected mode. Tuning-away of RF resources may reduce the data rate throughput of the call for the connected SIM, both because the call is disconnected while the RF resources are tuned-away and because the network will typically reduce the data rate (e.g., by changing a coding rate for transmissions) of the call after the RF resources are retuned and the call is reconnected.

Figure 5:
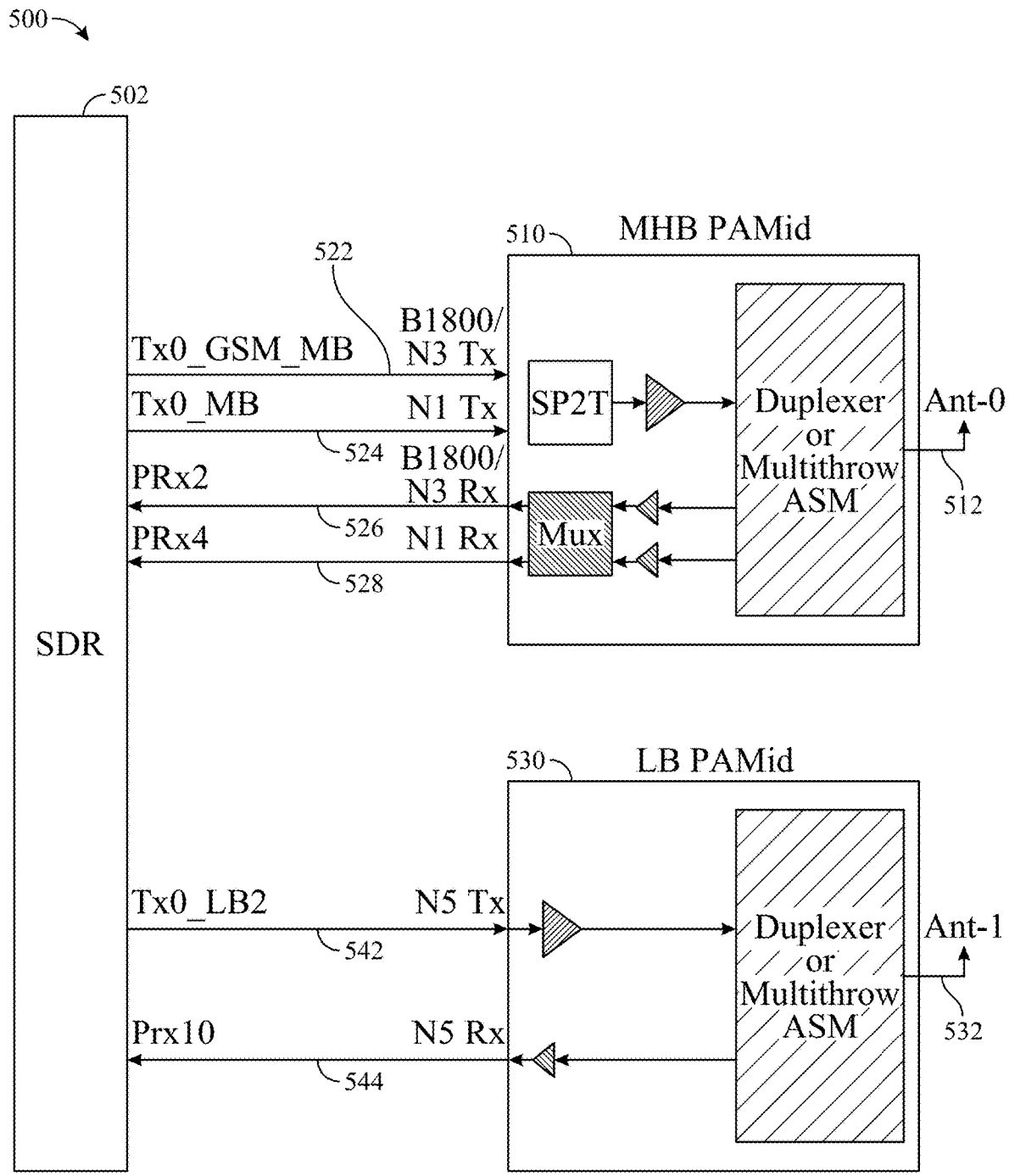
FIG. 5 depicts an example radio-frequency frontend of a user equipment.

FIG. 5 depicts an example radio-frequency front end (RFFE) 500 of a UE (e.g., UE 104, shown in FIGS. 1 and 3), in accordance with aspects of the present disclosure. The example RFFE 500 is an RFFE of a multiple subscriber identification module (MSIM) UE. The example RFFE 500 includes a software-defined radio (SDR) 502, a medium-high band (MHB) power amplifier module with integrated duplexer (PAMid) 510, a first antenna 512 connected with the MHB PAMid, a low band (LB) PAMid 530, and a second antenna 532 connected with the LB PAMid 530. The example RFFE 500 includes a first transmit chain Tx0_GSM MB for transmitting on the B1800 and N3 frequency bands, a second transmit chain Tx0_MB for transmitting on the N1 frequency band, and a third transmit chain Tx0_LB2 for transmitting on the N5 frequency band. The example RFFE 500 also includes a first receive chain PRx2 for receiving on the B1800 and N3 frequency bands, a second receive chain PRx4 for receiving on the N1 frequency band, and a third receive chain PRx10 for receiving on the N5 frequency band. In some cases, the UE may include a first SIM (SIM1, not shown) and a second SIM (SIM2, also not shown). In some cases, SIM1 may operate in a connected mode using a combination of frequency bands N1 and N3 (e.g., using carrier aggregation) for calls while SIM2 may be configured to listen for pages on a B1800 frequency band while operating in a standby or idle mode.

In some cases, when the UE is performing a call associated with SIM1 on the N1 and N3 frequency bands, the SDR 502 sends data 522 for transmissions of the call on the N3 band to the MHB PAMid 510. The SDR 502 may also send data 524 for transmissions of the call on the N1 band to the MHB PAMid 510. In some cases, the N3 frequency band associated with SIM1 and the B1800 frequency band associated with SIM2 may partially overlap. In some cases, due to this overlap, SIM1 and SIM2 may share usage of some components of the RFFE 500, such as one or more transmit chains and/or one or more receive chains. Further, due to the overlap between the N3 and B1800 frequency bands and the shared usage of components of the RFFE 500 by SIM1 and SIM2, the RFFE 500 may be required to tune-away from the N3 frequency band during the call for SIM1 to periodically monitor for the page for SIM2 on the B1800 frequency band. This tune-away may cause the SIM1 call to have reduced throughput and performance, since the tune-away may cause SIM1 to miss time for operation as well as the network possibly reducing the data rate of the SIM1 call when the RFFE 500 is retuned to the N3 frequency band. A more detailed example of these tune-aways and their associated issues is provided below.

For example, as noted above, the RFFE 500 of a UE (e.g., UE 104) may be associated with a first SIM (SIM1) and a second SIM (SIM2). In some cases, the UE may perform a call associated with SIM1 on an N1 and N3 frequency band combination using CA, while SIM2 is configured to listen for pages on a B1800 frequency band while operating in a standby or idle mode. In such cases, the UE may use the Tx0_GSM_MB transmit chain and the PRx2 receive chain for data transmission and reception of the call associated with SIM1 on the N3 frequency band. The UE may also use the PRx2 receive chain for monitoring for pages associated with SIM2 on the B1800 frequency band. When a paging occasion (PO) for the network subscription associated with SIM2 occurs, the UE causes the PRx2 receive chain to tune-away from the N3 frequency band associated with the SIM1 call to the B1800 frequency band, so the UE can monitor for a page associated with SIM2 on the B1800 frequency band.

As tuning-away can reduce the data throughput on the SIM1 call, if the UE can avoid tuning-away, then the UE may have superior data throughput on the SIM1 call. For example, if the UE moves the SIM1 call from the N1 and N3 frequency band combination to an N1 and N5 frequency band combination (assuming both combinations are supported by the UE and by the network), then the SIM1 call will utilize the Tx0_MB transmit chain and PRx4 receive chain for N1 frequency band communications, and the SIM1 call will utilize the Tx0_LB2 transmit chain and PRx10 receive chain for N5 frequency band communications. Thus, when the UE activates the PRx2 receive chain to monitor for pages associated with SIM2, the RFFE 500 of the UE does not need to perform a tune-away associated with the SIM1 call, since the SIM1 call uses a separate receive chain (e.g., PRx10), thereby avoiding the reduction in data throughput of the SIM1 call when monitoring for pages associated with SIM2.

However, in some cases, for lower cost chipset designs in particular, original equipment manufacturers (OEMs) may design these lower cost chip sets with limited RFFEs in order to reduce the cost of these chip sets. In such cases, tuning-away may be the only option for a UE employing such a lower cost chipset to support all MSIM features for concurrent support of both subs.

Further, even for SSIM UEs, certain combinations of CA frequency bands give sub-optimal performance, due to certain UE RFFE architectures or antennae performance. Such combinations of CA frequency bands are typically already known when a device is designed. Additionally, non-linear interference cancellation (NLIC) may impact which combinations of frequency bands are preferred for operation of a UE, because with certain combinations of CA frequency bands, simultaneous transmission and reception creates potential interference between the transmission and reception, due to RF imperfections. Further, intermodulation distortion (IMD) may also impact which combinations of frequency bands are preferred for operation of a UE, because the spectrum at the output of a non-linear device (e.g., an amplifier or mixer in a RFFE) may not only consist of the original signals but may also contain the sum and difference of the input signals, along with their harmonics. Moreover, in some cases, some combinations of low band (LB) frequency bands, like the B5 frequency band and N8 frequency band combination, may have transmit signals in a transmit frequency leaking through to the receive path of the UE, even with the use of filters by the UE. Such combinations are known to give sub-optimal performance for at least some UEs.

In some cases, if a UE utilizes a combination of CA frequency bands such that the RFFE architecture of the UE can simultaneously support a call with a connected SIM and listen for pages for another SIM, then the UE can avoid tuning-away RFFE resources. Thus, causing the network (e.g., a network entity, such as a BS) to serve calls and send pages using such a combination of frequency bands may result in the UE having superior throughput on a call and missing fewer pages. In some cases, to help achieve this, aspects of the present disclosure provide techniques for prioritizing usage of some frequency bands and combinations of frequency bands over other frequency bands and combinations of frequency bands. For example, such techniques may involve maintaining a high-priority list (HPL) and a low-priority list (LPL) of frequency bands and combinations of frequency bands that are supported by a UE, which may be used to select frequency bands or combinations of frequency bands on which to camp, perform calls, and in reporting measurements to the network to cause the network to favor frequency bands and combinations of frequency bands in the HPL when the network sends handover (HO) and call activation commands to the UE.

Example Operations of Entities in a Communications Network

Figure 6:
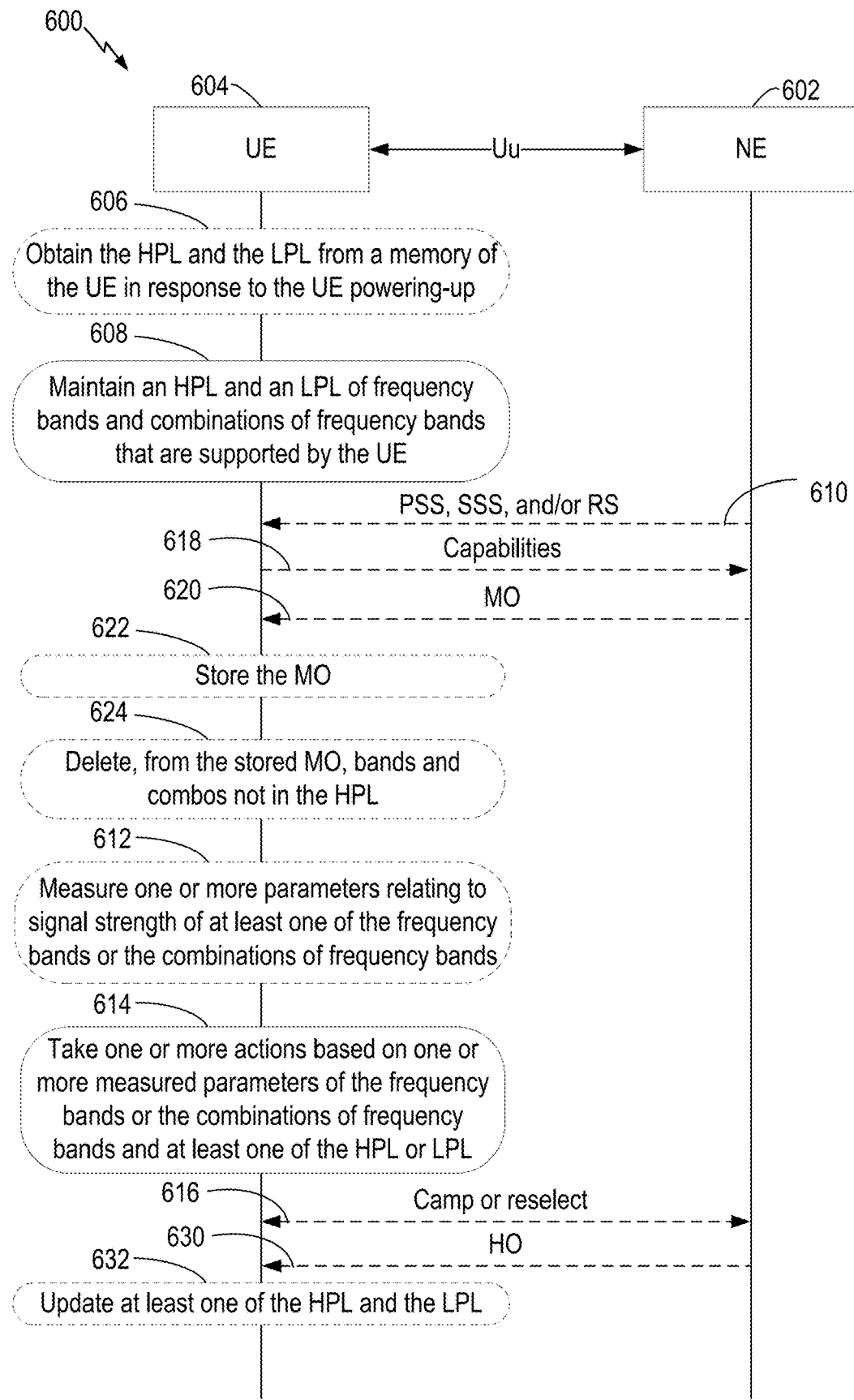
FIG. 6 depicts a process flow for communications in a network between a user equipment and a network entity.

FIG. 6 depicts a process flow 600 for communications in a network between a network entity (NE) 602 and a user equipment (UE) 604. In some aspects, the NE 602 may be an example of the BS 102 depicted and described with respect to FIGS. 1 and 3. Similarly, the UE 604 may be an example of UE 104 depicted and described with respect to FIGS. 1 and 3. However, in other aspects, UE 604 may be another type of wireless communications device and NE 602 may be another type of network entity or network node, such as those described herein. In aspects of the present disclosure, the UE 604 and the NE 602 may communicate via a Uu interface, as illustrated in FIG. 6.

At 608, the UE 604 maintains two or more sets of stand-alone (SA) frequency bands and/or carrier aggregation (CA) combinations of frequency bands in two or more lists, which may include a high-priority list (HPL) and a low-priority list (LPL). The HPL and the LPL may be based on one or more hardware (HW) components of the UE. In some cases, the frequency bands and/or combinations of frequency bands included in the HPL may be selected so that the UE avoids tune-aways while active on those combinations, while the frequency bands and/or combinations of frequency bands in the LPL may include all other combinations of frequency bands that are supported by the UE (i.e., combinations of frequency bands in which the UE tunes-away from one frequency band to transmit or receive on the other frequency band). For example, the HPL may include combinations of frequency bands such that, for each combination, an RFFE of the UE 604 may not be required to tune-away from one frequency band in the combination to receive on another frequency band in the combination, and the LPL may include other combinations of frequency bands that the UE can receive but for which, for each combination, the RFFE of the UE 604 may be required to tune-away from one frequency in the combination to receive on the other frequency in the combination.

At 610, the UE 604 optionally receives one or more of a primary synchronization signal (PSS), a secondary synchronization signal (SSS), and a reference signal (RS) from the network entity 602.

At 612, the UE 604 optionally measures one or more parameters relating to signal strength (e.g., reference signal received power (RSRP) or signal-to-noise ratio (SNR) of the signals received by the UE 604 at 610) of at least one of the frequency bands or the combinations of frequency bands in the HPL or the LPL that the UE maintains at 608.

At 614, the UE takes one or more actions based on one or more measured parameters of the frequency bands or the combinations of frequency bands and at least one of the HPL and the LPL.

In some cases, the UE 604 may include a first SIM and a second SIM. In some such cases, the UE may camp on a first frequency band or first combination of frequency bands using the first SIM, and taking the one or more actions at 614 may include camping, using the second SIM, on a second frequency band or second combination of frequency bands selected from the HPL or LPL and based on the first frequency band or first combination of frequency bands camped on using the first SIM. That is, when selecting a frequency band or combination of frequency bands to camp on using the second SIM, the UE makes the selection from the HPL or the LPL and based on which frequency band or combination of frequency bands on which the first SIM is camped. In some such cases the UE may further perform a call associated with the second SIM using a first frequency band or a first combination of frequency bands selected from the HPL or LPL. That is, while camped using the first SIM, the UE may perform a call associated with the second SIM using the frequency band or combination of frequency bands on which the UE is camped using the first SIM. In some such cases, the UE may perform, using carrier aggregation, a call associated with the first SIM using a second frequency band or a second combination of frequency bands selected from the HPL or LPL. That is, after camping with the first SIM on a first frequency band or first combination of frequency bands, the UE may perform a call with the first SIM using carrier aggregation using a different frequency band or combination of frequency bands selected from the HPL or the LPL.

In some cases, taking the one or more actions at 614 may include the UE 604 reporting (e.g., in measurement reports the UE 604 sends to the network entity 602 at 616) the one or more measured parameters of at least one of the frequency bands and/or combinations of frequency bands in the HPL while omitting the one or more measured parameters of the frequency bands or combinations of frequency bands in the LPL. By reporting the parameters for the frequency bands and/or combinations of frequency bands in the HPL while omitting the parameters of the frequency bands or combinations of frequency bands in the LPL, the UE may cause the network (e.g., network entity 604) to configure the frequency bands and/or combinations of frequency bands from the UE's HPL for handoffs (also referred to herein as handovers) or carrier aggregated calls more often than the network configures the frequency bands and/or combinations of frequency bands from the UE's LPL. By the network configuring the frequency bands and/or combinations of frequency bands from the UE's HPL more often than the frequency bands and/or combinations of frequency bands from the UE's LPL, the UE may avoid tune-aways from one frequency band to another frequency band. Avoiding tune-aways may enable the UE to achieve higher data throughput (TPUT) and/or better page performance (e.g., a higher success rate in receiving pages). Avoiding tune-aways may enable the UE to achieve better page performance because an RF chain that is tuning-away to receive a page sometimes misses the page, due to the RF chain requiring time to settle on the target frequency.

In some cases, when the HPL is not empty, taking the one or more actions at 614 may include the UE 604 camping on a first frequency band or a first combination of frequency bands that is included in the HPL based on the measured one or more parameters, as shown at 616. In some cases, when the HPL is empty, taking the one or more actions at 614 may include camping on a second frequency band or a second combination of frequency bands that is included in the LPL based on the measured one or more parameters. Thus, during an initial camping procedure for a first SIM of a UE, the UE may prioritize HPL frequency bands or combinations of frequency bands. Once the UE is camping on a frequency band with the first SIM, the UE may update the HPL and/or LPL for applications (e.g., calls) of a second SIM.

In some cases, the UE 604 may camp on a frequency band or a combination of frequency bands and reselect to a new frequency band or a new combination of frequency bands determined based on the HPL, as shown at 616. The UE may prioritize reselection to E-UTRA absolute radio frequency channel numbers (EARFCNs) that are included in the HPL, when reselecting.

In some cases, a UE, when in a call or in idle mode, may prioritize entering a new call on a carrier aggregated combination or an E-UTRAN new radio-dual connectivity (ENDC) combination of frequency bands that is included in the HPL. The UE may prioritize the frequency bands and/or combinations of the HPL by the UE pruning from measurement reports measurements of EARFCNs that are not included in the HPL or are in a combination that is not included in the HPL.

In some cases, the UE 604 may obtain the HPL and the LPL from a memory of the UE in response to the UE powering-up, as shown at 606. The UE 604 may, for example, generate a HPL based on a static list (e.g. stored in a memory of the UE) when the UE powers-up.

In some cases, the HPL and the LPL may be further based on non-linear interference cancellation (NLIC) of a combination of frequency bands or intermodulation distortion (IMD) of a combination of frequency bands. That is, when generating or updating the HPL or the LPL, the UE 604 may place a combination of frequency bands in the LPL, based on information that the UE encounters NLIC when transmitting and/or receiving on the combination of frequency bands.

In some cases, the one or more hardware components on which configuration the HPL and the LPL maintained at 608 and/or obtained from a memory of the UE at 606 may include a radio-frequency front end (RFFE) of the UE 604. The HPL and/or the LPL used by the UE 604 at power-up may be generated from a static list that may be determined based on a configuration of one or more HW components of the UE 604 (e.g., the static list may include frequency bands and combinations of frequency bands on which multiple SIMs of the UE can operate without an RFFE of the UE tuning-away from one frequency band being used by one SIM to support operations by another SIM). The HPL may be dynamically updated by the UE 604 during operations in the network, for example based on updates to frequency bands used by a second SIM and/or a CA configuration received from the network entity 602.

In some cases, the UE 604 may generate a LPL when the UE 604 powers-up by including all frequency bands and frequency band combinations supported by the UE 604 except those frequency bands and frequency band combinations included in the HPL.

In some cases, the UE 604 may generate and maintain additional lists (e.g., more than two lists) of frequencies and frequency band combinations, with more priorities (e.g., priorities between high priority and low priority). The lists can be used and/or dynamically populated so that all sets of frequency bands and frequency band combinations supported by the UE 604 are included in at least one list.

In some cases, the UE 604 at 618 may optionally report, to the network entity 602, one or more capabilities of the UE 604 including one or more frequency bands or one or more combinations of frequency bands that are supported by the UE 604. In such cases, the UE 604 may optionally receive, based on the one or more capabilities of the UE, a measurement object (MO) from the network entity, wherein the MO includes a list of indicators of network-supported frequency bands or network-supported combinations of frequency bands for carrier aggregation or handover, as shown at 620.

Further, in such cases, taking the one or more actions at 614 may optionally include determining one or more of the network-supported frequency bands or the network-supported combinations of frequency bands are included in the HPL. That is, the UE may compare the MO to the HPL and determine which of the network-supported frequency bands and combinations of frequency bands are also in the HPL. In such cases, the UE may also report, in a measurement report transmitted at 626 to the network entity 602, the measured one or more parameters corresponding to the network-supported frequency bands or the network-supported combinations of frequency bands that are included in the HPL. The UE may also omit, from the measurement report, the measured one or more parameters corresponding to the network-supported frequency bands or the network-supported combinations that are not included in the HPL.

In some cases, because the network generates HO commands based on the measurement report from the UE, reporting measurements only for frequency bands and combinations of frequency bands in the HPL (i.e., omitting measurements for frequency bands and combinations that are not in the HPL) may cause the network to generate HO commands to the UE to hand over to frequency bands or combinations that are in the HPL and cause the network to avoid generating HO commands to the UE to hand over to frequency bands or combinations that are not in the HPL. In such cases, the UE 604 may optionally receive from the network entity 602 a HO command instructing the UE to hand over to a frequency band or combination of frequency bands in the HPL based on the measurement report, as shown at 630. In such cases, the UE 604 may optionally store the MO in a memory of the UE at 622 and delete, from the stored MO, the indicators corresponding to the network-supported frequency bands or the network-supported combinations (also referred to as "combos") of frequency bands that are in the MO and not included in the HPL or that are included in the LPL, as shown at 624.

In some cases, the UE 604 may optionally update at least one of the HPL and the LPL, as shown at 632. In some such cases, the UE 604 may update the HPL or the LPL based on a data throughput rate for a combination of frequency bands.

For example, the UE 604 may determine a data throughput rate for a first combination of frequency bands is lower than a data throughput rate for a second combination of frequency bands, and the UE 604 may move the first combination of frequency bands from the HPL to the LPL. In some such cases, the UE 604 may update the HPL or the LPL based on page performance for a combination of frequency bands. For example, the UE 604 may determine that the UE 604 misses pages when using a combination of frequency bands, and the UE 604 may then move that combination of frequency bands to the LPL. In some such cases, the UE 604 may update the HPL or the LPL based on quality for a combination of frequency bands. For example, the UE 604 may determine that a call has a high block error rate (BLER) when the UE 604 performs the call using a combination of frequency bands, and the UE 604 may move that combination of frequency bands to the LPL.

In some cases, the UE 604 has a single SIM. In such cases, the HPL may include a first set of frequency bands or combinations of frequency bands associated with camping and a second set of frequency bands or combinations of frequency bands associated with calls. The first set of frequency bands or combinations of frequency bands may be based on a first RFFE performance metric associated with camping, and the second set of frequency bands or combinations of frequency bands is based on a second RFFE performance metric associated with calls. That is, a UE 604 which has a single SIM may categorize frequency bands and combinations of frequency bands in the HPL based on whether the frequency bands and combinations of frequency bands are good for camping and/or whether the frequency bands and combinations of frequency bands are good for calls. In such cases, the UE 604 may determine which frequency bands and combinations of frequency bands on which to camp based on those frequency bands and combinations of frequency bands being categorized as good for camping. And similarly, in such cases the UE 604 may determine which frequency bands and combinations of frequency bands to use for performing calls based on those frequency bands and combinations of frequency bands being categorized as good for performing calls.

Figure 7:
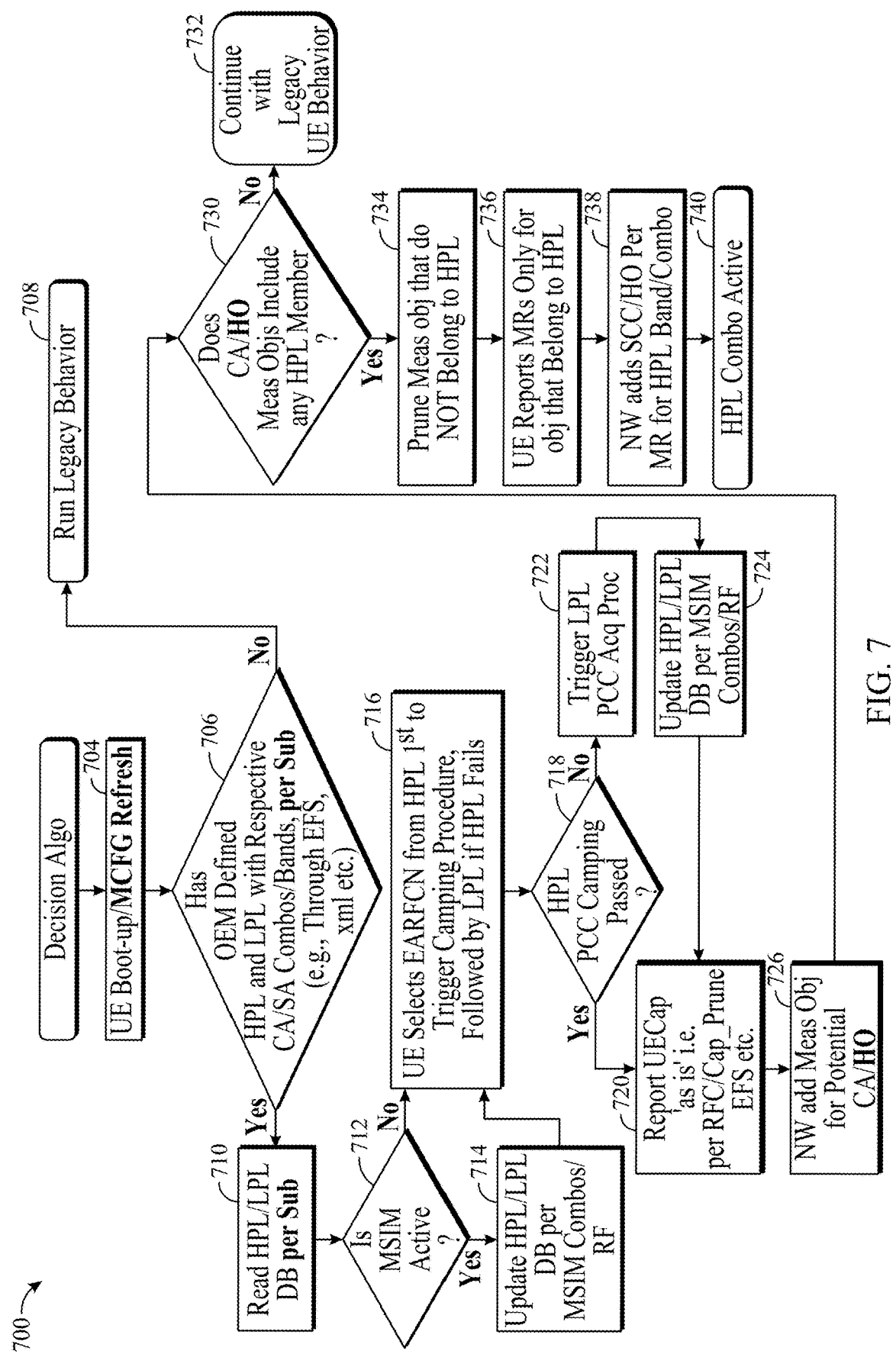
FIG. 7 depicts an example algorithm that a user equipment may use to perform wireless communications.

FIG. 7 depicts an example algorithm 700 for performing wireless communications, according to aspects of the present disclosure. In some cases, one or more aspects of the algorithm 700 may be performed by a network entity, such as the BS 102 and/or network entity 602. In some cases, one or more aspects of the algorithm 700 may be performed by a UE, such the UE 104 and/or UE 604.

As shown, at 704, the UE performs a modem configuration (MCFG) refresh in response to booting-up (e.g., powering-up). At 706, the UE determines whether the UE has an original equipment manufacturer (OEM) defined HPL and LPL, per subscription (e.g., per SIM) with respect to CA/SA frequency combinations or bands. If the UE does not have an HPL or LPL, the UE proceeds to 708 and uses a single list. If, however, the UE does have an HPL and/or LPL, then the algorithm 700 proceeds to 710 with the UE reading the HPL and LPL for each sub from the OEM list(s).

Thereafter, as shown at 712, the UE determines if multiple SIMs of the UE are active (e.g., if the UE is configured to communicate using MSIM). If the UE is not configured with MSIM, then the algorithm 700 proceeds to 716 as described below. If the UE is configured with MSIM, then the UE updates the HPL and LPL for each sub per the MSIM combinations of frequency bands (e.g., the combinations of frequency bands supported by the active SIMS) and proceeds to 716. At 716, the UE selects one or more E-UTRA Absolute Radio Frequency Channel Numbers (EARFCNs) from the HPL and triggers a camping procedure on the corresponding frequency band(s). If the UE does not successfully camp on any of the frequency bands corresponding to an EARFCN(s) from the HPL, then the UE selects one or more EARFCNs from the LPL and triggers a camping procedure on the corresponding frequency band(s).

At 718, the UE determines whether the UE camped on a frequency band or combination (e.g., a primary component carrier (PCC)) from the HPL. If not, then the algorithm proceeds to 722, otherwise the algorithm 700 proceeds to 720. At 722, the UE triggers an acquisition process for a PCC in the LPL and the algorithm 700 proceeds to 724. At 724, the UE updates the HPL and LPL per the MSIM combinations (e.g., the combinations of frequency bands supported by the active SIMS) and the algorithm 700 proceeds to 720.

At 720, the UE reports its capabilities (i.e., frequency bands and combinations of frequency bands on which the UE can transmit and receive) to the network. At 726, the network entity configures and transmits a measurement object (MO) to the UE indicating one or more frequency bands for the UE to measure and report on in preparation for a potential carrier aggregation or handover by the UE. At 730, the UE determines whether the MO indicates any frequency bands or combinations of frequency bands that are included in the HPL. If the MO does not indicate any frequency bands or combinations of frequency bands included in the HPL, the algorithm 700 proceeds to 732 with the UE operating according to legacy behavior. If, however, the MO indicates any frequency bands or combinations of frequency bands that are included in the HPL, the algorithm 700 proceeds to 734, where the UE prunes (e.g., deletes) from the MO any frequency bands and combinations of frequency bands (indicated in the MO) that are not included in the HPL.

At 736, the UE performs one or more measurements and reports the one or more measurements in measurement reports (MRs) only for objects remaining in the MO after the pruning, which all correspond to frequency bands and combinations of frequency bands included in the HPL. At 738, the network entity configures a secondary component carrier (SCC) for the UE or sends a HO command based on the one or more measurements included in the MRs that the UE reported for the frequency bands and combinations of frequency bands included in the HPL (e.g., the frequency bands and combinations of frequency bands not pruned from the MO). Thereafter, as shown at 740, the UE operates on a frequency band or combinations of frequency bands that is in the HPL, based on the configured SCC or handover command.

In some cases, the techniques described herein related to the use of the HPL and LPL may enable a UE to avoid performing tune-aways by causing the UE to transmit or receive on frequency bands and combinations of frequency bands for which the UE is not required to perform tune-aways more often than the UE transmits or receives frequency bands and combinations of frequency bands for which the UE is required to perform tune-aways. Advantages of avoiding performing tune-aways may include improving performance of a UE, such as by improving throughput (TPUT) for a call. A tune-away for a MSIM UE can have dual impacts that may decrease throughput of a call for the UE. The dual impacts include potentially missing packets (for any or all of the multiple SIMs of the UE) and potentially causing the network to ramp-down traffic rates (e.g., transmission and reception data rates) to the UE, which can reduce throughput for a call while the network ramps-up the traffic rates to the UE to again reach peak levels. Additionally, the techniques described herein may enable a UE to avoid operating in frequency band combos that are known to result in decreased UE performance (e.g., combinations of frequency bands for which it is known that a UE will perform NLIC or it is known that the combination will result in IMD at the UE).

Additionally, the architecture of the RFFE in a UE is important, especially in low-tier chipsets where the lower cost of the chipsets typically results in UEs having less-capable RFFEs. The less-capable RFFEs may increase the probability of the UE tuning-away from a call active on SIM1 in order for the UE to monitor for pages for SIM2 (e.g., a DSDS scenario). Also, for a UE that is nominally capable of DSDA operations, a less-capable RFFE can increase the chances of the UE tuning-away and possibly prevent the UE from engaging in DSDA for certain combos.

Example Operations of a User Equipment

FIG. 8 shows a method 800 for wireless communications by a UE, such as UE 104 of FIGS. 1 and 3.

Method 800 begins at step 802 with maintaining a high-priority list (HPL) and a low-priority list (LPL) of frequency bands and combinations of frequency bands that are supported by the UE, wherein the HPL and the LPL are based on one or more hardware (HW) components of the UE.

Method 800 then proceeds to step 804 with taking one or more actions based on one or more measured parameters of the frequency bands or the combinations of frequency bands and at least one of the HPL and the LPL.

In some cases, the one or more HW components of the UE comprise a radio-frequency front-end (RFFE) of the UE.

In some cases, when the HPL is not empty, taking the one or more actions in step 804 comprises camping on a first frequency band or a first combination of frequency bands that is included in the HPL based on the measured one or more parameters. In some cases, when the HPL is empty, taking the one or more actions in step 804 comprises camping on a second frequency band or a second combination of the frequency bands that is included in the LPL based on the measured one or more parameters.

In some cases, the UE comprises at least a first subscriber identification module (SIM) and a second SIM. In some such cases, method 800 may further include camping on a first frequency band or first combination of frequency bands using the first SIM, wherein taking the one or more actions comprises, based on the first frequency band or first combination of frequency bands camped on using the first SIM, camping on a second frequency band or second combination of frequency bands using the second SIM selected from the HPL or LPL. In some such cases method 800 may further include at least one of: performing a call associated with the second SIM using a first frequency band or a first combination of frequency bands selected from the HPL or LPL or performing, using carrier aggregation, a call associated with the first SIM using a second frequency band or a second combination of frequency bands selected from the HPL or LPL.

In some cases, method 800 may further include camping on a frequency band or a combination of frequency bands and reselecting to a new frequency band or a new combination of frequency bands determined based on the HPL.

In some cases, the HPL and the LPL are further based on non-linear interference cancellation (NLIC) of a combination of frequency bands or intermodulation distortion (IMD) of a combination of frequency bands.

In some cases, method 800 may further include obtaining the HPL and the LPL from a memory of the UE in response to the UE powering-up.

In some cases, when the HPL is not empty, taking the one or more actions in step 804 comprises reporting the one or more measured parameters of at least one of the frequency bands or combinations of frequency bands in the HPL while omitting the one or more measured parameters of the frequency bands or combinations of frequency bands in the LPL.

In some cases, method 800 may further include reporting, to a network entity, one or more capabilities of the UE including one or more frequency bands or one or more combinations of frequency bands that are supported by the UE. In some such cases, method 800 may further include receiving, based on the one or more capabilities of the UE, a measurement object (MO) from the network entity, wherein the MO comprises a list of indicators of network-supported frequency bands or network-supported combinations of frequency bands for carrier aggregation or handover. In some cases, taking the one or more actions in step 804 may include determining one or more of the network-supported frequency bands or the network-supported combinations of frequency bands are included in the HPL. Additionally in some such cases, taking the one or more actions in step 804 may further include reporting, in a measurement report transmitted to the network entity, the measured one or more parameters corresponding to the network-supported frequency bands or the network-supported combinations of frequency bands that are included in the HPL. Additionally in some such cases, taking the one or more actions in step 804 may further include omitting, from the measurement report, the measured one or more parameters corresponding to the network-supported frequency bands or the network-supported combinations that are not included in the HPL. In some such cases, method 800 further includes receiving, from the network entity, a handover (HO) command instructing the UE to hand over to a frequency band or combination of frequency bands in the HPL based on the measurement report. In some such cases, method 800 further includes storing the MO in a memory of the UE. In some such cases, method 800 further includes deleting, from the stored MO, the indicators corresponding to the network-supported frequency bands or the network-supported combinations of frequency bands that are in the MO and that are not included in the HPL or that are included in the LPL.

In some cases, method 800 may further include updating at least one of the HPL and the LPL based on at least one of: data throughput rate for a combination of frequency bands, page performance for a combination of frequency bands, and quality for a combination of frequency bands (e.g., one or more parameters related to the combo and measured by the UE, such as reference signal received power (RSRP), signal-to-noise ratio (SNR), or block error rate (BLER)).

In some cases, method 800 may further include maintaining one or more additional priority lists of frequency bands and combinations of frequency bands that are supported by the UE, wherein the additional priority lists have different priorities than the HPL and the LPL and wherein taking the one or more actions in step 804 is further based on the one or more additional priority lists.

In some cases, the UE includes a single subscriber identification module (SIM). In some such cases, the HPL includes a first set of frequency bands or combinations of frequency bands associated with camping and a second set of frequency bands or combinations of frequency bands associated with calls. In some such cases, the first set of frequency bands or combinations of frequency bands is based on a first radio-frequency front-end (RFFE) performance metric associated with camping. In some such cases, the second set of frequency bands or combinations of frequency bands is based on a second RFFE performance metric associated with calls.

Figure 9:
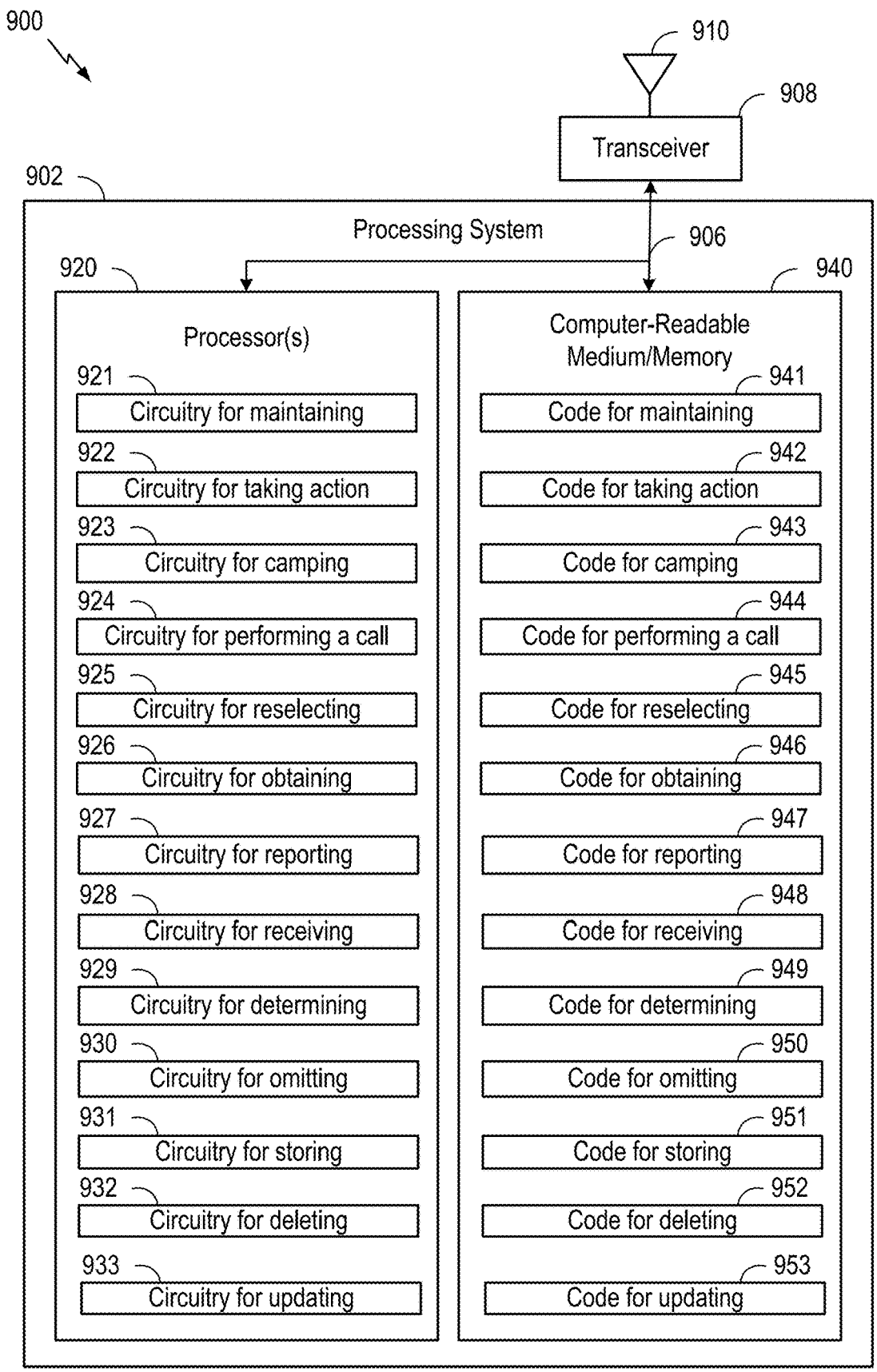
FIG. 9 depicts aspects of an example communications device.

In one aspect, method 800, or any aspect related to it, may be performed by an apparatus, such as communications device 900 of FIG. 9, which includes various components operable, configured, or adapted to perform the method 800. Apparatus 900 is described below in further detail.

Note that FIG. 8 is just one example of a method, and other methods including fewer, additional, or alternative steps are possible consistent with this disclosure.

Example Communications Devices

FIG. 9 depicts aspects of an example communications device 900. In some aspects, communications device 900 is a user equipment, such as UE 104 described above with respect to FIGS. 1 and 3.

The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes one or more processors 920. In various aspects, the one or more processors 920 may be representative of one or more of receive processor 358, transmit processor 364, TX MIMO processor 366, and/or controller/processor 380, as described with respect to FIG. 3. The one or more processors 920 are coupled to a computer-readable medium/memory 930 via a bus 906. In certain aspects, the computer-readable medium/memory 930 is configured to store instructions (e.g., computer-executable code) that when executed by the one or more processors 920, cause the one or more processors 920 to perform the method 800 described with respect to FIG. 8, or any aspect related to it. Note that reference to a processor performing a function of communications device 900 may include one or more processors performing that function of communications device 900.

In the depicted example, computer-readable medium/memory 940 stores code (e.g., executable instructions) for maintaining 941, code for taking action 942, code for camping 943, code for performing a call 944, code for reselecting 945, code for obtaining 946, code for reporting 947, code for receiving 948, code for determining 949, code for omitting 950, code for storing 951, code for deleting 952, and code for updating 953. Processing of the code 941-953 may cause the communications device 900 to perform the method 800 described with respect to FIG. 8, or any aspect related to it.

The one or more processors 920 include circuitry configured to implement (e.g., execute) the code stored in the computer-readable medium/memory 930, including circuitry for maintaining 921, circuitry for taking action 922, circuitry for camping 923, circuitry for performing a call 924, circuitry for reselecting 925, circuitry for obtaining 926, circuitry for reporting 927, circuitry for receiving 928, circuitry for determining 929, circuitry for omitting 930, circuitry for storing 931, circuitry for deleting 932, and circuitry for updating 933. Processing with circuitry 921-933 may cause the communications device 900 to perform the method 800 described with respect to FIG. 8, or any aspect related to it.

Various components of the communications device 900 may provide means for performing the method 800 described with respect to FIG. 8, or any aspect related to it. For example, means for transmitting, sending or outputting for transmission may include the transceivers 354 and/or antenna(s) 352 of the UE 104 illustrated in FIG. 3 and/or transceiver 908 and antenna 910 of the communications device 900 in FIG. 9. Means for receiving or obtaining may include the transceivers 354 and/or antenna(s) 352 of the UE 104 illustrated in FIG. 3 and/or transceiver 908 and antenna 910 of the communications device 900 in FIG. 9.

Example Clauses

Implementation examples are described in the following numbered clauses:

Clause 1: A method for wireless communication by a user equipment (UE), comprising: maintaining a high-priority list (HPL) and a low-priority list (LPL) of frequency bands and combinations of frequency bands that are supported by the UE, wherein the HPL and the LPL are based on one or more hardware (HW) components of the UE; and taking one or more actions based on one or more measured parameters of the frequency bands or the combinations of frequency bands and at least one of the HPL and the LPL.

Clause 2: The method of clause 1, wherein the one or more HW components of the UE comprise a radio-frequency front-end (RFFE) of the UE.

Clause 3: The method of any of clauses 1-2, wherein: when the HPL is not empty, taking the one or more actions comprises camping on a first frequency band or a first combination of frequency bands that is included in the HPL based on the one or more measured parameters, and when the HPL is empty, taking the one or more actions comprises camping on a second frequency band or a second combination of the frequency bands that is included in the LPL based on the one or more measured parameters.

Clause 4: The method of any of clauses 1-3, wherein the UE comprises at least a first subscriber identification module (SIM) and a second SIM.

Clause 5: The method of clause 4, further comprising: camping on a first frequency band or first combination of frequency bands using the first SIM, wherein: taking the one or more actions comprises, based on the first frequency band or first combination of frequency bands camped on using the first SIM, camping on a second frequency band or second combination of frequency bands using the second SIM selected from the HPL or LPL.

Clause 6: The method of any of clauses 4-5, further comprising at least one of: performing a call associated with the second SIM using a first frequency band or a first combination of frequency bands selected from the HPL or LPL; or performing, using carrier aggregation, a call associated with the first SIM using a second frequency band or a second combination of frequency bands selected from the HPL or LPL.

Clause 7: The method of any of clauses 1-4, further comprising: camping on a frequency band or a combination of frequency bands; and reselecting to a new frequency band or a new combination of frequency bands determined based on the HPL.

Clause 8: The method of clauses 1-7, wherein the HPL and the LPL are further based on non-linear interference cancellation (NLIC) of a combination of frequency bands or intermodulation distortion (IMD) of a combination of frequency bands.

Clause 9: The method of any of clauses 1-8, further comprising: obtaining the HPL and the LPL from a memory of the UE in response to the UE powering-up.

Clause 10: The method of any of clauses 1-9, wherein, when the HPL is not empty: taking the one or more actions comprises reporting the one or more measured parameters of at least one of the frequency bands or combinations of frequency bands in the HPL while omitting the one or more measured parameters of the frequency bands or combinations of frequency bands in the LPL.

Clause 11: The method of any of clauses 1-10, further comprising reporting, to a network entity, one or more capabilities of the UE including one or more frequency bands or one or more combinations of frequency bands that are supported by the UE.

Clause 12: The method of clause 11, further comprising: receiving, based on the one or more capabilities of the UE, a measurement object (MO) from the network entity, wherein the MO comprises a list of indicators of network-supported frequency bands or network-supported combinations of frequency bands for carrier aggregation or handover, wherein taking the one or more actions comprises: determining one or more of the network-supported frequency bands or the network-supported combinations of frequency bands are included in the HPL, reporting, in a measurement report transmitted to the network entity, the one or more measured parameters corresponding to the network-supported frequency bands or the network-supported combinations of frequency bands that are included in the HPL, and omitting, from the measurement report, the one or more measured parameters corresponding to the network-supported frequency bands or the network-supported combinations that are not included in the HPL.

Clause 13: The method of clause 12, further comprising: receiving, from the network entity, a handover (HO) command instructing the UE to hand over to a frequency band or combination of frequency bands in the HPL based on the measurement report.

Clause 14: The method of any of clauses 12-13, further comprising: storing the MO in a memory of the UE; and deleting, from the stored MO, the indicators corresponding to the network-supported frequency bands or the network-supported combinations of frequency bands that are in the MO and that are not included in the HPL or that are included in the LPL.

Clause 15: The method of any of clauses 1-14, further comprising: updating at least one of the HPL and the LPL based on at least one of: data throughput rate for a combination of frequency bands, page performance for a combination of frequency bands, and quality for a combination of frequency bands.

Clause 16: The method of any of clauses 1-15, further comprising: maintaining one or more additional priority lists of frequency bands and combinations of frequency bands that are supported by the UE, wherein the additional priority lists have different priorities than the HPL and the LPL, wherein taking the one or more actions is further based on the one or more additional priority lists.

Clause 17: The method of any of clauses 1-3, wherein: the UE includes a single subscriber identification module (SIM), the HPL includes a first set of frequency bands or combinations of frequency bands associated with camping and a second set of frequency bands or combinations of frequency bands associated with calls, the first set of frequency bands or combinations of frequency bands is based on a first radio-frequency front-end (RFFE) performance metric associated with camping, and the second set of frequency bands or combinations of frequency bands is based on a second RFFE performance metric associated with calls.

Clause 18: An apparatus, comprising: a memory comprising executable instructions; and a processor configured to execute the executable instructions and cause the apparatus to perform a method in accordance with any one of Clauses 1-17.

Clause 19: An apparatus, comprising means for performing a method in accordance with any one of Clauses 1-17.

Clause 20: A non-transitory computer-readable medium comprising executable instructions that, when executed by a processor of an apparatus, cause the apparatus to perform a method in accordance with any one of Clauses 1-17.

Clause 21: A computer program product embodied on a computer-readable storage medium comprising code for performing a method in accordance with any one of Clauses 1-17.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), comprising:
    maintaining at least one prioritized list of frequency bands and combinations of frequency bands that are supported by the UE, wherein:
        priorities of the frequency bands and combinations of frequency bands in the at least one prioritized list are based on one or more hardware (HW) components of the UE; and
        the one or more HW components of the UE comprise a radio-frequency front-end (RFFE) of the UE;
    taking one or more actions based on one or more measured parameters of the frequency bands or the combinations of frequency bands and the at least one prioritized list.

2. The method of claim 1, wherein:
    the at least one prioritized list comprises a high-priority list (HPL) and a low-priority list (LPL).

3. The method of claim 2, wherein:
    when the HPL is not empty, taking the one or more actions comprises camping on a first frequency band or a first combination of frequency bands that is included in the HPL based on the one or more measured parameters, and
    when the HPL is empty, taking the one or more actions comprises camping on a second frequency band or a second combination of the frequency bands that is included in the LPL based on the one or more measured parameters.

4. The method of claim 2, wherein the UE comprises at least a first subscriber identification module (SIM) and a second SIM.

5. The method of claim 4, further comprising:
    camping on a first frequency band or first combination of frequency bands using the first SIM, wherein:
        taking the one or more actions comprises, based on the first frequency band or first combination of frequency bands camped on using the first SIM, camping on a second frequency band or second combination of frequency bands using the second SIM selected from the HPL or LPL.

6. The method of claim 4, further comprising at least one of:
    performing a call associated with the second SIM using a first frequency band or a first combination of frequency bands selected from the HPL or LPL; or
    performing, using carrier aggregation, a call associated with the first SIM using a second frequency band or a second combination of frequency bands selected from the HPL or LPL.

7. The method of claim 2, further comprising:
    camping on a first frequency band or a first combination of frequency bands; and
    reselecting to a new frequency band or a new combination of frequency bands determined based on the HPL.

8. The method of claim 2, wherein the HPL and the LPL are further based on non-linear interference cancellation (NLIC) of a combination of frequency bands or intermodulation distortion (IMD) of a combination of frequency bands.

9. The method of claim 2, further comprising:
    obtaining the HPL and the LPL from a memory of the UE in response to powering-up the UE.

10. The method of claim 2, wherein, when the HPL is not empty:
    taking the one or more actions comprises reporting the one or more measured parameters of at least one of the frequency bands or combinations of frequency bands in the HPL while omitting the one or more measured parameters of the frequency bands or combinations of frequency bands in the LPL.

11. The method of claim 2, further comprising reporting, to a network entity, one or more capabilities of the UE including one or more frequency bands or one or more combinations of frequency bands that are supported by the UE.

12. The method of claim 11, further comprising:
    receiving, based on the one or more capabilities of the UE, a measurement object (MO) from the network entity, wherein the MO comprises a list of indicators of network-supported frequency bands or network-supported combinations of frequency bands for carrier aggregation or handover, wherein taking the one or more actions comprises:
        determining one or more of the network-supported frequency bands or the network-supported combinations of frequency bands are included in the HPL,
        reporting, in a measurement report transmitted to the network entity, the one or more measured parameters corresponding to the network-supported frequency bands or the network-supported combinations of frequency bands that are included in the HPL, and omitting, from the measurement report, the one or more measured parameters corresponding to the network-supported frequency bands or the network-supported combinations that are not included in the HPL.

13. The method of claim 12, further comprising:

receiving, from the network entity, a handover (HO) command instructing the UE to hand over to a frequency band or combination of frequency bands in the HPL based on the measurement report.

14. The method of claim 12, further comprising:

storing the MO in a memory of the UE; and deleting, from the stored MO, the indicators corresponding to the network-supported frequency bands or the network-supported combinations of frequency bands that are in the MO and that are not included in the HPL or that are included in the LPL.

15. The method of claim 2, further comprising:

updating at least one of the HPL and the LPL based on at least one of:
  data throughput rate for a combination of frequency bands,
  page performance for a combination of frequency bands, and
  quality for a combination of frequency bands.

16. The method of claim 2, further comprising:

maintaining one or more additional priority lists of frequency bands and combinations of frequency bands that are supported by the UE, wherein the additional priority lists have different priorities than the HPL and the LPL, wherein:
  taking the one or more actions is further based on the one or more additional priority lists.

17. The method of claim 2, wherein:

the UE includes a single subscriber identification module (SIM), the HPL includes a first set of frequency bands or combinations of frequency bands associated with camping and a second set of frequency bands or combinations of frequency bands associated with calls, the first set of frequency bands or combinations of frequency bands is based on a first RFFE performance metric associated with camping, and the second set of frequency bands or combinations of frequency bands is based on a second RFFE performance metric associated with calls.

18. A user equipment (UE) configured for wireless communications, comprising:

one or more processors configured to execute instructions stored on one or more memories and to cause the UE to:

maintain at least one prioritized list of frequency bands and combinations of frequency bands that are supported by the UE, wherein:
    priorities of the frequency bands and combinations of frequency bands in the at least one prioritized list are based on one or more hardware (HW) components of the UE; and
    the one or more HW components of the UE comprise a radio-frequency front-end (RFFE) of the UE;

take one or more actions based on one or more measured parameters of the frequency bands or the combinations of frequency bands and the at least one prioritized list.

19. The UE of claim 18, wherein:

the at least one prioritized list comprises a high-priority list (HPL) and a low-priority list (LPL); and the one or more processors are further configured to cause the UE to:
  camp on a first frequency band or a first combination of frequency bands; and
  reselect to a new frequency band or a new combination of frequency bands determined based on the HPL.

20. A non-transitory computer-readable medium, comprising:

instructions that, when executed by one or more processors of a user equipment (UE), cause the UE to:

maintain at least one prioritized list of frequency bands and combinations of frequency bands that are supported by the UE, wherein:
    priorities of the frequency bands and combinations of frequency bands in the at least one prioritized list are based on one or more hardware (HW) components of the UE; and
    the one or more HW components of the UE comprise a radio-frequency front-end (RFFE) of the UE;

take one or more actions based on one or more measured parameters of the frequency bands or the combinations of frequency bands and the at least one prioritized list.

* * * * *